United States Patent
Chen et al.

(10) Patent No.: US 6,548,318 B2
(45) Date of Patent: Apr. 15, 2003

(54) FABRICATION METHOD FOR A MULTI-LAYERED THIN FILM PROTECTIVE LAYER

(75) Inventors: Wei-Shiau Chen, Chin-Men Hsien (TW); Kao-Su Huang, Tainan Hsien (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 09/999,634

(22) Filed: Oct. 24, 2001

(65) Prior Publication Data

US 2002/0076863 A1 Jun. 20, 2002

Related U.S. Application Data

(62) Division of application No. 09/479,483, filed on Jan. 10, 2000.

(30) Foreign Application Priority Data

Jul. 19, 1999 (TW) ........................................ 88112203 A

(51) Int. Cl.7 ............................................. H01L 21/311
(52) U.S. Cl. ............................ 438/30; 438/34; 438/38; 438/958; 438/954
(58) Field of Search .............................. 438/26, 30, 34, 438/38, 763, 902, 954, 958, FOR 395, FOR 398, FOR 401, FOR 489

(56) References Cited

U.S. PATENT DOCUMENTS

| | | | |
|---|---|---|---|
| 5,773,844 A | * 6/1998 | Kawamura et al. | 257/57 |
| 5,886,761 A | * 3/1999 | Sasaki et al. | 349/122 |
| 6,144,082 A | * 11/2000 | Yamazaki et al. | 257/412 |
| 6,344,888 B2 | * 2/2002 | Yasukawa | 349/113 |
| 2001/0043175 A1 | * 11/2001 | Yasukawa | 345/87 |
| 2001/0046011 A1 | * 11/2001 | Yasukawa | 349/113 |
| 2002/0008799 A1 | * 1/2002 | Ota et al. | 349/43 |
| 2002/0028411 A1 | * 3/2002 | Park et al. | 430/314 |
| 2002/0057406 A1 | * 5/2002 | Yasukawa | 349/113 |

* cited by examiner

Primary Examiner—George Fourson

(57) ABSTRACT

A fabrication method for a multi-layered thin film protective layer which is applicable on a substrate comprising a peripheral circuit area and a pixel cell area is described. Metal layers and pixel cells are formed on the peripheral circuit area and the pixel cell area, respectively, wherein an insulation material is formed in the interspace between the metal layers and between the pixel cells to provide a sufficient separation. Thereafter, a first oxide layer, a silicon nitride layer and a second oxide layer are sequentially formed on the pixel cells and the metal layers. The second oxide layer is then patterned to define a pre-determined position of a pad spacer in the pixel cell area and the peripheral circuit area. The silicon nitride layer and the first oxide layer are further defined to form a first protective layer in the peripheral circuit area and to from a pad spacer in the pixel cell area exposing the pixel cells. A second protective layer is then formed on the exposed pixel cells.

12 Claims, 5 Drawing Sheets

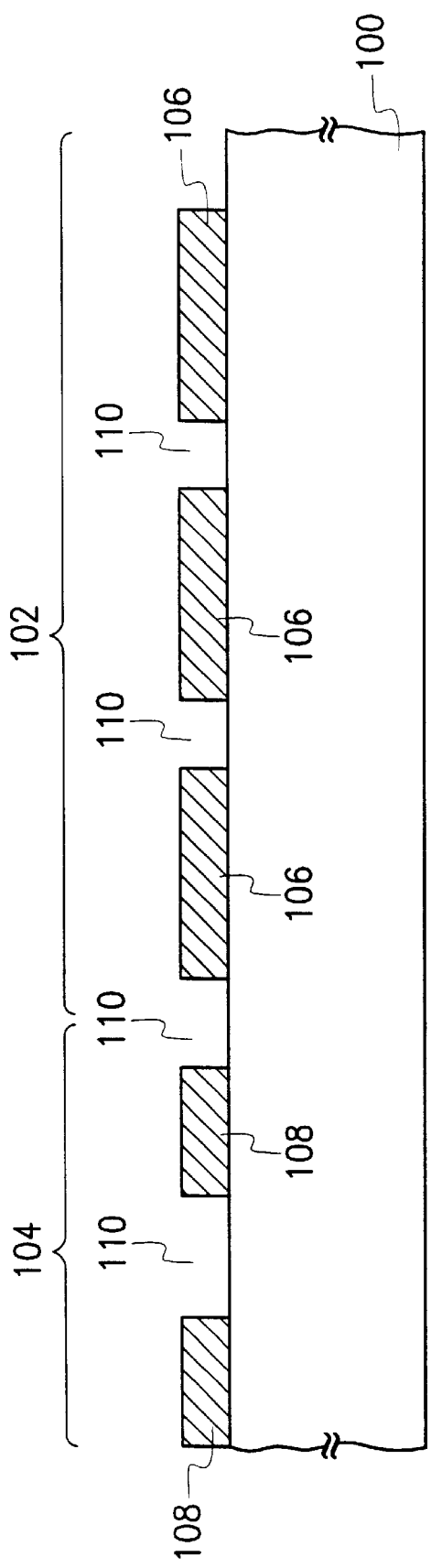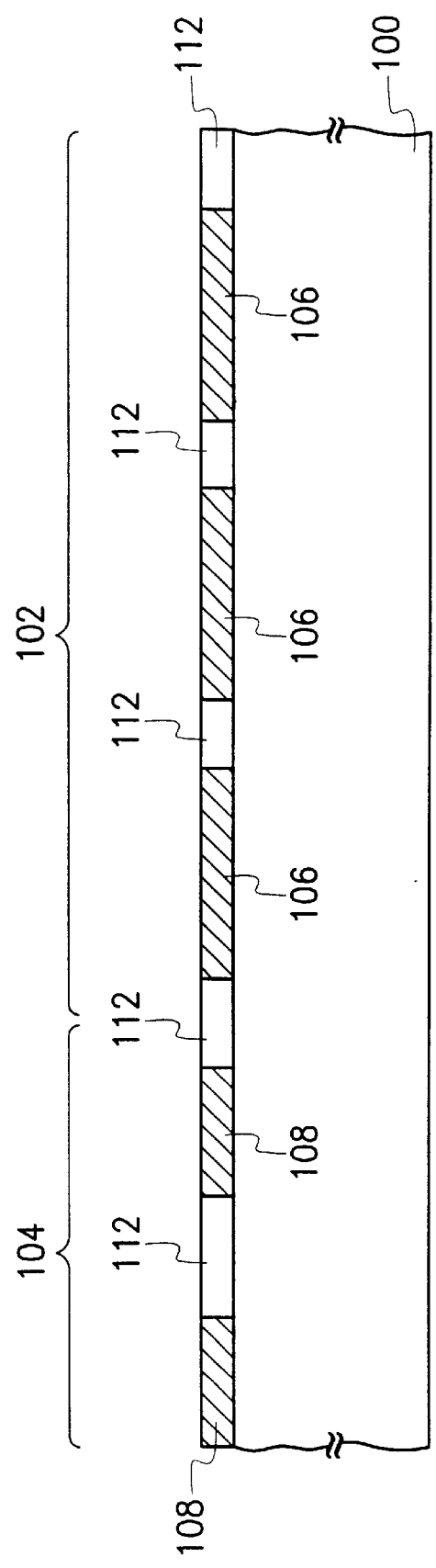
FIG. 1A
FIG. 1B

FABRICATION METHOD FOR A MULTI-LAYERED THIN FILM PROTECTIVE LAYER

CROSS-REFERENCE TO RELATED APPLICATION

This application is a division of U.S. patent application Ser. No. 09/479,483, filed Jan. 10, 2000, which claimed the priority benefit of Taiwan Application Serial No. 88112203, filed Jul. 19, 1999.

BACKGROUND OF THE INVENTION

1. Field of the Invention

This invention relates to a fabrication method for a protective layer. More particularly, the invention relates to a fabrication method for a multi-layered thin film protective layer of a reflective micro liquid crystal display ($\mu$-LCD) device.

2. Description of the Related Art

The operation of a reflective micro-LCD device is based on an application of a voltage to the metal layer on the surface of a control circuit. The electric field is generated to control the orientation of the liquid crystal. As light transmits through the liquid crystal and reaches the metal layer, the metal layer reflects the light, which in turn transmits through the liquid crystal. The different orientations of the liquid crystal display different optical properties, thereby displaying in different images on the reflective $\mu$-LCD.

During the packaging of the reflective $\mu$-LCD device, filling the liquid crystal requires coating a spacer between the glass plate and the device wafer to separate the glass plate and the device wafer. In addition, a protective layer is formed on the metal layer of the device surface to protect the underlying device.

The spacer, however, can only be coated on the periphery of the device, and the glass plate supported by the spacer bends easily at the center of the glass plate due to stress. As a result, while filling the liquid crystal, the thickness of the liquid crystal cannot be uniform. A Newton's ring thus results. The non-uniform thickness of the liquid crystal seriously affects the quality of the display. Not only the displaying color is changed, but the differentiation between the shades of color is also reduced.

The metal layer of the device requires a protective layer to prevent the metal surface from moisture penetration and from being scratched. The structure of the protective layer and the combination of thicknesses of the thin films directly affect the reflection property of the metal layer. The fabrication of the protective layer is therefore a very critical step in the manufacturing of a reflective micro-LCD device.

SUMMARY OF THE INVENTION

In the light of the forgoing, the present invention provides a fabrication for a reflective $\mu$-LCD device, wherein protective layers of various structures are formed to satisfy the needs of the different protective layers for the different device areas.

In addition, the present invention provides a fabrication for a protective layer structure as a spacer in the device wafer to support the glass plate and the device wafer and to improve the Newton's ring effect.

The present invention further provides a fabrication method for a multi-layered thin film protective layer, which is applicable to a substrate comprising a peripheral circuit area and a pixel cell area. A metal layer and pixel cells are formed in the peripheral circuit area and the pixel cell area, respectively, and the metal layers and the pixel cell layers are separated by an insulation material. Thereafter, a first oxide layer, a silicon nitride layer and a second oxide layer are sequentially formed on the pixel cells and the metal layer. The second oxide layer is then defined, which in turn defines the predetermined positions of the pad spacers in the pixel cell area and the peripheral circuit area. The silicon nitride layer and the first oxide layer are further defined to form a first protective layer and to form a pad spacer in the pixel cell area, exposing the pixel cells. After this, a second protective layer is formed on the exposed pixel cells. The pad spacer is formed with a first oxide layer, a silicon nitride layer and a second oxide layer. The first protective layer is formed with the silicon nitride layer and the first oxide layer. The second protective layer is a thin oxide layer.

The present invention accommodates the needs of the different protective layers for the various device areas. A protective layer, which prevents moisture penetration and scratching, is formed to protect the device from being damaged. In the area that requires a high reflectivity, a protective layer with a high reflectivity is formed to fulfill the product requirement. In addition, pad spacers are formed on the device wafer, wherein the pad spacer is higher than the protective layer to facilitate the filling the liquid crystal and to lower the stress generated in packaging, thereby preventing the occurrence of the Newton's ring effect. The thickness of the liquid crystal is therefore more uniform, and the resulting liquid crystal device has a better capability of differentiating the various shades of color.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIGS. 1A to 1F are schematic, cross-sectional views showing the fabrication of the multi-layered protective layer for a reflective micro-LCD device.

DESCRIPTION OF THE PREFERRED EMBODIMENT

The function varies for the different device areas of the reflective micro-LCD, thereby mandating different protective layer structures. The conventional protective layer structure of a silicon nitride layer/silicon oxide layer has the functions of preventing scratching and moisture penetration. For the pixel cell area of a reflective $\mu$-LCD device, the reflectivity of the silicon nitride layer/silicon oxide layer, however, is not acceptable. Therefore, the formation of a silicon nitride layer/silicon oxide layer in the pixel cell area affects the reflectivity of the pixel cells. The peripheral circuit area of a reflective $\mu$-LCD device, on the other hand, still needs to prevent scratching and moisture penetration. The formation of a protective layer with better reflectivity, although able to accommodate the needs of the pixel cell area, cannot, however, prevent the peripheral circuit area form being scratched and penetrated by moisture.

According to the preferred embodiment of the present invention, a fabrication for a multi-layered thin film protective layer structure on a device wafer of the reflective micro-LCD device is provided. A silicon nitride/silicon oxide protective layer is formed in the region that mandates the protection of moisture penetration and scratching, and only a thin oxide layer is formed in the area that requires a higher reflectivity. In other words, different protective layer structures are formed according to the functions of the different device areas. Furthermore, during the formation of the above protective layers, pad spacers are formed and scattered in the device wafer to support the glass plate and the device wafer and to prevent the generation of the stress during the packaging process.

Figure 1C:
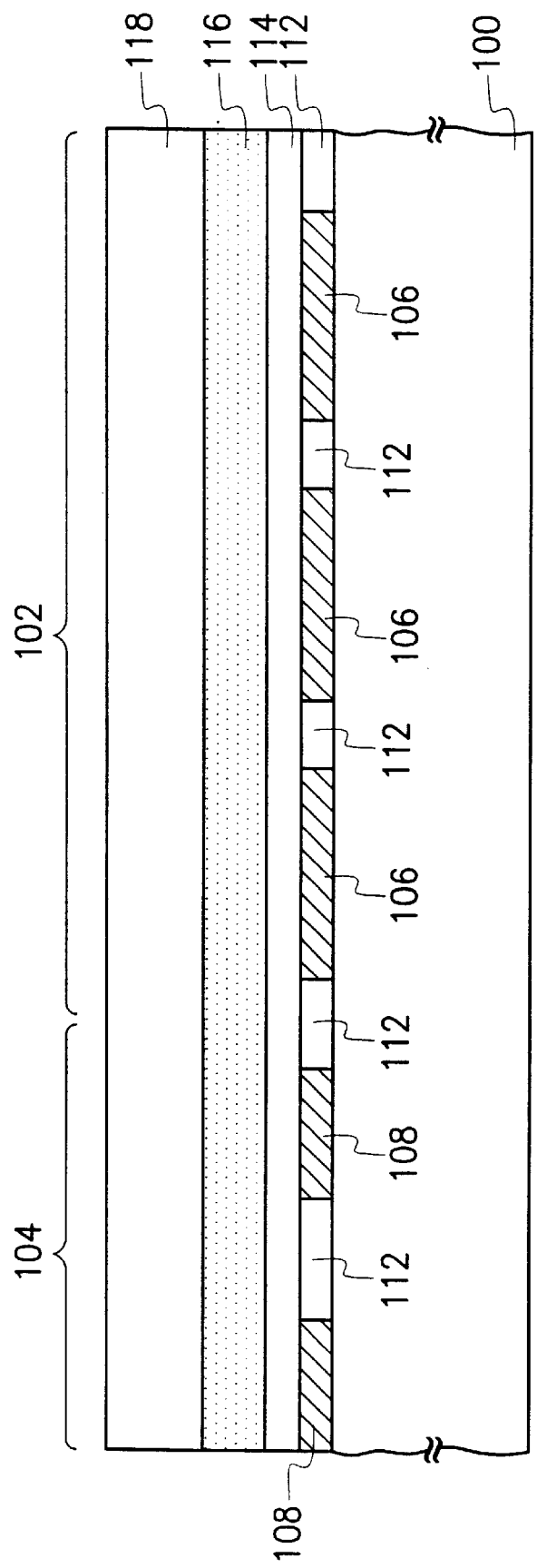

FIGS. 1A to 1F are schematic, cross-sectional views showing the fabrication of multi-layered protective layer for a reflective micro-LCD device. Referring to FIG. 1A, a substrate 100 of a reflective micro-LCD device comprises a pixel cell area 102 and a peripheral circuit area 104. The pixel cells 106 in pixel cell area 102 are formed with a metal material, which is served to connect the circuitry in the substrate 100. The metal layers 108 on the peripheral circuit area 104 are also for the connection of the circuitry from the substrate 100. The pixel cells 106 and the metal layers 108 are separated by the mirror layer gaps 110.

The mirror layer gaps are then filled with an insulation material 112 as illustrated in FIG. 1B. The insulation layer 112 is deposited on the pixel cells 106 and on the metal layers 108. The insulation layer 112, for example, an oxide layer formed by high density plasma chemical vapor deposition (HDPCVD), fills the mirror layer gaps 10 and covers the metal layers 108 and the pixel cells 106. The insulation material 112 is then planarized by chemical mechanical polishing and is etched back to expose the pixel cells 106 and the metal layers 108. The insulation material 112 that fills the mirror layer gaps 110 is thereby sufficient to separate the pixel cells 106 from the metal layers 108.

Thereafter, the fabrication of the protective layer is then conducted as shown in FIG. 1C, in which a layer of an oxide material 114 is formed on the pixel cell area 102 and the peripheral circuit area 104, covering the pixel cells 106 and the metal layers 108. The oxide layer 114 is deposited by, for example, chemical vapor deposition, to a thickness of approximately 1000 Å. A silicon nitride layer 116 is further formed on the oxide layer 114, followed by forming another oxide layer 118. The silicon nitride layer 116, formed by, for example, chemical vapor deposition, is approximately 4200 Å thick, and the oxide layer 118 is approximately 10000 Å thick with an error of 10%.

Figure 1D:
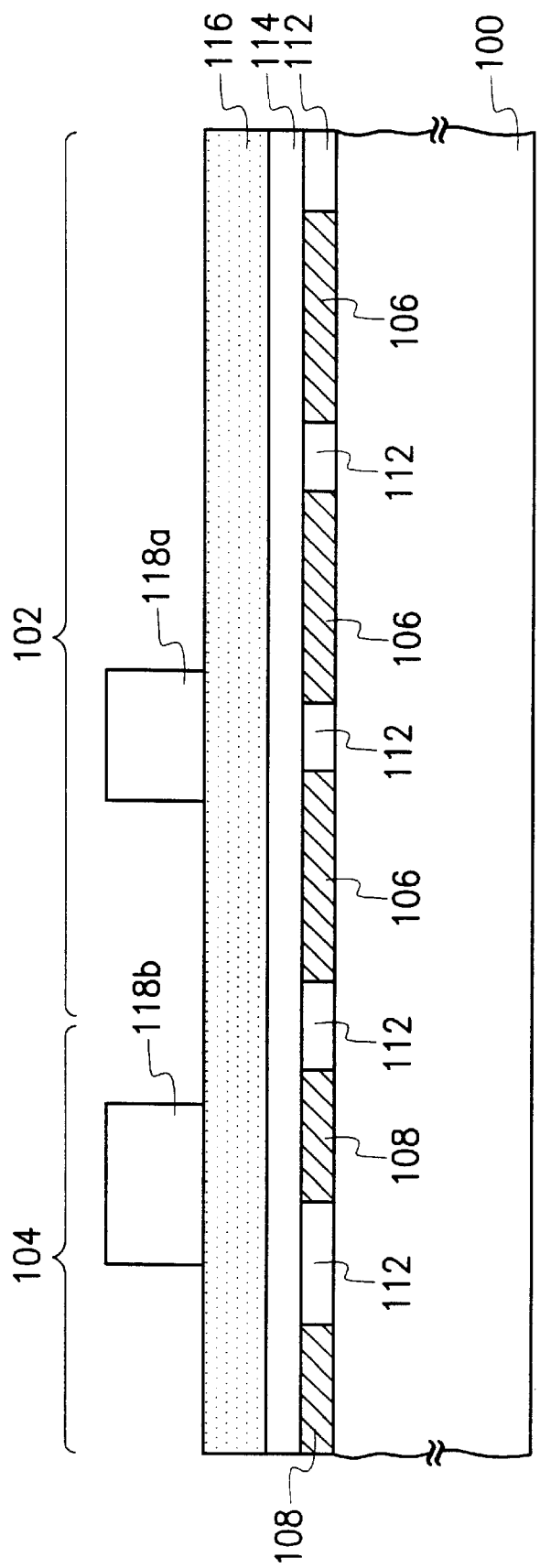

A first protective layer etching process is then conducted to define the positions of the pad spacers. As shown in FIG. 1D, by means of photolithography, the oxide layer 118 is defined, followed by an etching of the oxide layer 118 while using the silicon nitride layer 116 as an etch stop. The defined oxide layer 118a, 118b become portions of the subsequently formed pad spacers. The oxide layers 118a, 118b of the pad spacers are formed on the pixel cell area 102 and the peripheral circuit area 104, respectively.

Figure 1E:
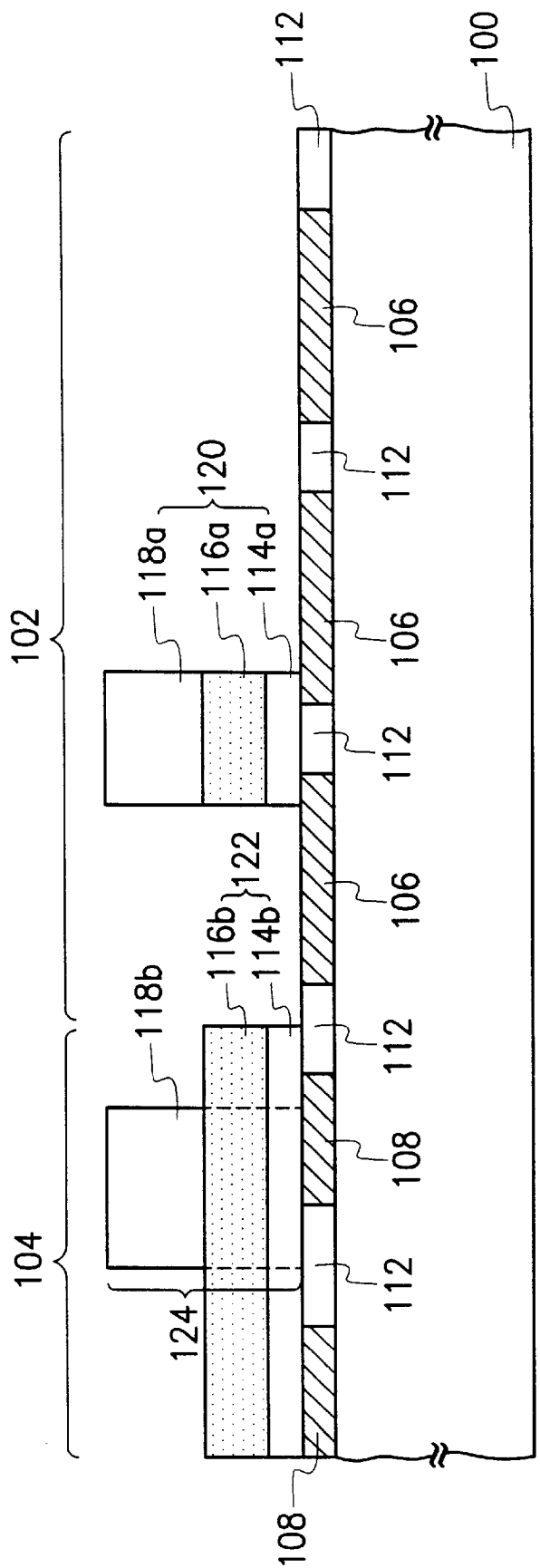

Thereafter, a second protective layer etching process is conducted to define the positions of protective layer in the peripheral circuit area 104 and the pad spacers. Referring to FIG. 1E, the positions for the protective layer 122 of the peripheral circuit area 104 and the pad spacers 118b and 120 are formed simply by defining the silicon nitride layer 116 and the oxide layer 114 using the photolithography technique. The pixel cell area 102 mandates a protective layer with a greater reflectivity. The combination of the silicon nitride layer 116 and the oxide layer 114, however, does not have a high reflectivity. The exposed silicon nitride layer 116 and the oxide layer 114 are thus removed in the etching process using the pixel cells 106 as an etch stop. A majority of the pixel cells 106 are then exposed. The pad spacer 120 of the pixel cell area 102 is also defined in this etching process based on the previously defined oxide layer 118a. On the other hand, the peripheral circuit area 104 must be covered with a protective layer to prevent scratching and moisture penetration. The silicon nitride layer 116b and the oxide layer 114b in the peripheral circuit area 104 are retained as the protective layer 122 for the peripheral circuit area 104, which is completed concurrently in the second protective layer etching process. Furthermore, the peripheral circuit area 104 also needs the formation of a pad spacer. As a result, the peripheral circuit area 104 retains a portion of the oxide layer 118b as a pad spacer during the definition of the oxide layer 118.

The pad spacer 120 of the pixel cell area 102 is formed by the oxide layer 118a, the silicon nitride layer 116a and the oxide layer 114a. The pad spacer 122 of the peripheral circuit area 104 is formed by the oxide layer 118b and the underlying protective layer 122. The area of the oxide layer 118a defined in the pixel cell area 102 cannot be too big, for example, approximately 4 microns×4 microns, because a pad spacer 120 with an overly big area affects the reflectivity and the light blocking effect. Furthermore, the pad spacer 120 of the pixel cell area 102 needs to form above the insulation material 112, which is the intersection of the pixel cells 106. As a result, the arrangement and the dimension of the pixel cells 106 in the pixel cell area 102 determine the dimensions of the pad spacer 120.

Because the pad spacers 120 are formed in the cell pixel area 102 and the peripheral circuit area 104, the pad spacers are scattered in the wafer device. These pad spacers 120 are to provide support for the glass plate and the device wafer, and to prevent stresses from being induced during the packaging process, which stress would lead to the occurrence of the Newton's ring while filling the liquid crystal. The thickness of the filled liquid crystal is thus more uniform. Furthermore, the pad spacer 120 comprising the oxide layer 118a/silicon nitride layer 116a/oxide layer 114a is higher than the protective layer 122 to facilitate the filling of the liquid crystal and to determine the thickness of the liquid crystal. The thickness of the oxide layer 118a can vary according to the required thickness of the liquid crystal or the type of products.

Figure 1F:
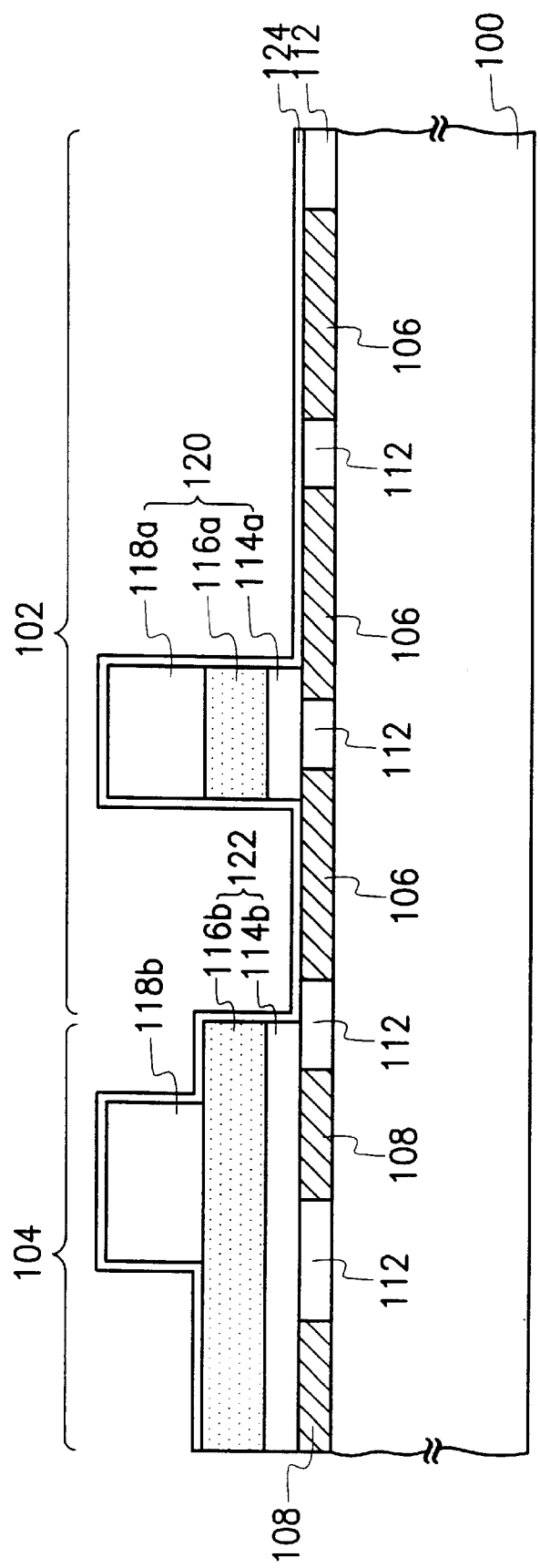

A protective layer 124 with a higher reflectivity is further formed on the substrate 100 as shown in FIG. 1F. The reflectivity of the protective layer 124 is high enough for light to transmit through the protective layer 124 to reach the cell pixels 106 and to reflect back. The protective layer 124, for example, is a thin oxide layer or a combination of the silicon nitride layer/oxide layer. The protective layer 124 covers at least the pixel cells 106 in the pixel cell area 102 and serves as a protective layer for the pixel cells 106. The protective layer 124 can also cover other areas in the substrate 100. The thin oxide layer is, for example, a chemical vapor deposited tetra-ethyl-ortho-silicate (TEOS) layer of approximately 500 Å thick.

Since the reflectivity for the thin oxide layer 124 is approximately 85%, covering the pixel cells 106 with the thin oxide layer 124 does not seriously affect the reflectivity of the pixel cells 106 when the light reaches the pixel cells 106. The thin oxide layer 124 can also provide an appropriate protection for the pixel cells 106.

The present invention provides a multiple etching steps in forming the multi-layer of the thin films in order to accommodate the different demands of the protective layers in the reflective micro-LCD. For example, the fabrication of a silicon nitride/oxide material is to protect the peripheral circuit area from moisture penetration and from being scratched. For the pixel cell area, which mandates a high reflectivity, an oxide material is formed as the protective layer. Furthermore, to facilitate the filling of the liquid crystal, the height of the pad spacers formed are higher. The pad spacers are formed with a structure of oxide material/nitride material/oxide material, wherein the order of the thin films and their thicknesses can vary accordingly.

The present invention provides a fabrication method for a protective layer for the peripheral circuit area to prevent moisture penetration and scratching, and a protective layer for the pixel cell area, to satisfy the demand of having the different protective layer structures in the different device areas. In addition, during the fabrication process according to the preferred embodiment of the present invention, the formation of the protective layer provides the pad spacers in the peripheral circuit area and in the pixel cell area. The pad spacers are scattered on the wafer device to lower the stress effects during the packaging process and to allow a uniform filling of the liquid crystal.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A fabrication method for a multi-layered thin film protective layer, which is applicable to a substrate comprising a peripheral circuit area and a pixel cell area, wherein the peripheral circuit area comprises a plurality of metal layers and the pixel cell area comprises a plurality of pixel cells, the fabrication method comprising the steps of:

filling an insulation material between the pixel cells and the metal layers;

forming sequentially a first oxide layer, a silicon nitride layer and a second oxide layer to cover the pixel cells and the metal layers;

patterning the second oxide layer to define a predetermined position for a spacer;

defining the silicon nitride layer and the first oxide layer to form a first protective layer and a first spacer in the peripheral circuit area and to form a second spacer in the pixel cell area exposing the pixel cells, wherein the first protective layer is formed with the silicon nitride layer and the first oxide layer, the first spacer and the second spacer are formed with the second oxide material, the silicon nitride layer and the first oxide material, and the first and the second spacers are higher than the first protective layer; and forming a second protective layer in the substrate covering the pixel cell area.

2. The fabrication method for a multi-layered thin film protective layer according to claim 1, wherein the second protective layer includes a thin oxide layer.

3. The fabrication method for a multi-layered thin film protective layer according to claim 2, wherein the reflectivity of the thin oxide layer is approximately 85%.

4. The fabrication method for a multi-layered thin film protective layer according to claim 2, wherein the thin oxide layer is approximately 500 Å thick.

5. The fabrication method for a multi-layered thin film protective layer according to claim 2, the thin oxide layer includes tetra-ethyl-ortho silicate.

6. The fabrication method for a multi-layered thin film protective layer according to claim 1, wherein the second pad spacer is formed on the isolation material.

7. The fabrication method for a multi-layered thin film protective layer according to claim 1, wherein the dimensions for the second pad spacer are approximately 4 microns×4 microns.

8. The fabrication method for a multi-layered thin film protective layer according to claim 1, wherein the first oxide layer is approximately 1000 Å thick.

9. The fabrication method for a multi-layered thin film protective layer according to claim 1, wherein the silicon nitride layer is approximately 4200 Å thick.

10. The fabrication method for a multi-layered thin film protective layer according to claim 1, wherein the silicon nitride layer serves as an etch stop while defining of the second oxide layer.

11. The fabrication method for a multi-layered thin film protective layer according to claim 1, wherein the pixel cells serve as an etch stop while defining the silicon nitride layer and the first oxide layer.

12. The fabrication method for a multi-layered thin film protective layer according to claim 1, wherein the step of filling between the pixel cells and the metal layers with an insulation material further includes:

forming an insulation layer on the substrate to cover the pixel cells and the metal layers; and planarizing the insulation layer to expose the pixel cells and the metal layers.

* * * * *